(12) United States Patent
Emori

(10) Patent No.: US 11,528,321 B2
(45) Date of Patent: Dec. 13, 2022

(54) LOAD BALANCING SYSTEM, LOAD BALANCING METHOD, AND NON-TRANSITORY RECORDING MEDIUM

(71) Applicant: Mototsugu Emori, Tokyo (JP)

(72) Inventor: Mototsugu Emori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/649,587

(22) Filed: Feb. 1, 2022

(65) Prior Publication Data

US 2022/0272150 A1 Aug. 25, 2022

(30) Foreign Application Priority Data

Feb. 19, 2021 (JP) .............................. JP2021-025419

(51) Int. Cl.
*G06F 15/16* (2006.01)
*H04L 67/1004* (2022.01)
*H04L 67/1027* (2022.01)
*H04L 67/146* (2022.01)

(52) U.S. Cl.
CPC ...... *H04L 67/1004* (2013.01); *H04L 67/1027* (2013.01); *H04L 67/146* (2013.01)

(58) Field of Classification Search
CPC .......................... H04L 67/1004; H04L 67/1027
See application file for complete search history.

(56) References Cited

U.S. PATENT DOCUMENTS

| 6,772,333 | B1* | 8/2004 | Brendel | H04L 67/1001 |
| | | | | 713/153 |
| 7,088,718 | B1* | 8/2006 | Srivastava | H04L 67/1031 |
| | | | | 370/392 |
| 7,321,926 | B1* | 1/2008 | Zhang | H04L 67/1017 |
| | | | | 718/104 |
| 8,892,768 | B2* | 11/2014 | Amemiya | H04L 67/1027 |
| | | | | 709/218 |

(Continued)

FOREIGN PATENT DOCUMENTS

| JP | 2011-076425 | 4/2011 |
| JP | 2014-225157 | 12/2014 |
| JP | 2016-045802 | 4/2016 |

OTHER PUBLICATIONS

Extended European for EP22153223.7 mailed on Jun. 13, 2022.

*Primary Examiner* — Richard G Keehn
(74) *Attorney, Agent, or Firm* — IPUSA, PLLC

(57) ABSTRACT

A load balancing system, a load balancing method, and a non-transitory recording medium. The load balancing system includes a first client apparatus and a second client apparatus each of which communicates with a particular server among a plurality of servers through a load balancer that distributes load of the plurality of servers. The first client apparatus transmits to the load balancer, a request to the server to acquire identification information for identifying the particular server selected by the load balancer from among the plurality of servers, notifies the second client apparatus of the identification information of the particular (Continued)

server, the second client apparatus requesting the load balancer to connect to the particular server, and requests the load balancer to connect to the particular server using the identification information.

10 Claims, 11 Drawing Sheets

(56) References Cited

U.S. PATENT DOCUMENTS

| | | | |
|---|---|---|---|
| 2004/0024881 A1* | 2/2004 | Elving | H04L 67/1008 709/227 |
| 2006/0013147 A1* | 1/2006 | Terpstra | H04L 67/563 370/252 |
| 2012/0284296 A1* | 11/2012 | Arifuddin | H04L 67/1027 709/219 |
| 2013/0060941 A1* | 3/2013 | Terpstra | H04L 65/1094 709/225 |
| 2018/0006952 A1* | 1/2018 | Nakakura | G06F 9/5083 |
| 2019/0028569 A1* | 1/2019 | Keller | H04L 67/63 |

* cited by examiner

LOAD BALANCING SYSTEM, LOAD BALANCING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-025419, filed on Feb. 19, 2021, in the Japan Patent Office, the entire disclosure of which is hereby incorporated by reference herein.

BACKGROUND

Technical Field

The present disclosure relates to a load balancing system, a load balancing method, and a non-transitory recording medium.

Related Art

In a client-server system, as the number of client terminals increases, load on server increases. To solve such a problem, a load balancing system in which a plurality of servers and a load balancer are installed on a network, and the load balancer distributes and transfers a request sent by a client terminal to a plurality of servers, is available.

Further, in the load balancing system, a technique for maintaining one session (guaranteeing uniqueness) by distributing related requests among requests sent by the same client terminal to the same server is known.

SUMMARY

Embodiments of the present disclosure describe a load balancing system, a load balancing method, and a non-transitory recording medium. The load balancing system includes a first client apparatus and a second client apparatus each of which communicates with a particular server among a plurality of servers through a load balancer that distributes load of the plurality of servers. The first client apparatus transmits to the load balancer, a request to the server to acquire identification information for identifying the particular server selected by the load balancer from among the plurality of servers, notifies the second client apparatus of the identification information of the particular server, the second client apparatus requesting the load balancer to connect to the particular server, and requests the load balancer to connect to the particular server using the identification information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
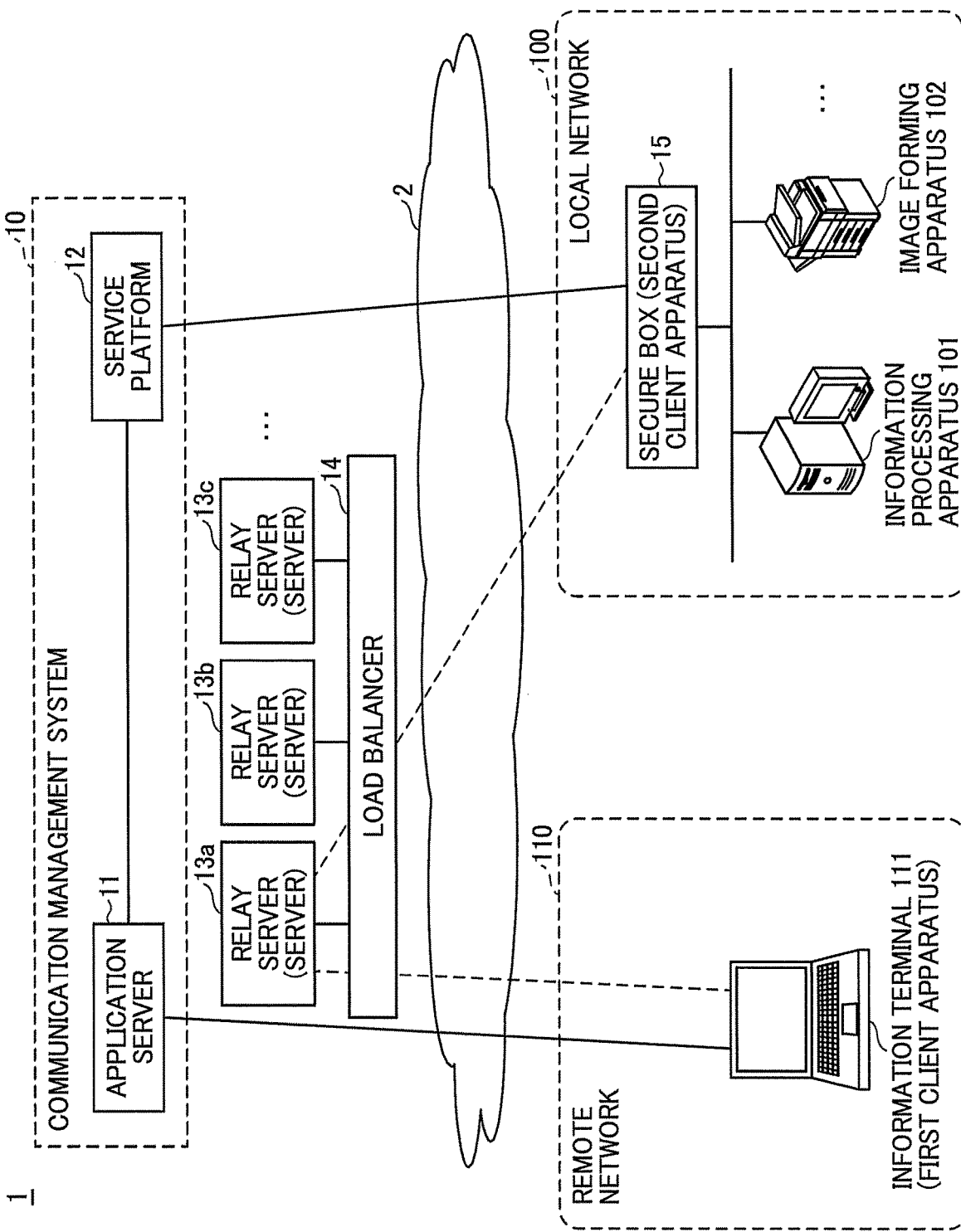
FIG. 1 is a block diagram illustrating an example of a system configuration of a communication system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of the present disclosure with reference to drawings.

FIG. 1 is a block diagram illustrating an example of a system configuration of a communication system according to the present embodiment. The communication system 1 includes, for example, an application server 11, a service platform 12, a plurality of relay box 15, and the like. In the following description, "relay server 13" is used to refer to any one of the plurality of relay servers 13a, 13b, 13c, and so forth. The number of the plurality of relay servers 13 illustrated in FIG. 1 is an example, and the number may be two or more other numbers.

The communication system 1 is, for example, a system for remotely accessing an information processing apparatus 101, an image forming apparatus 102, or the like from an information terminal 111 connected to a remote network 110 through a secure box 15 connected to a local network 100. Further, the communication system 1 is an example of a load balancing system including a plurality of servers, and a first client apparatus and a second client apparatus that communicate with a selected server among the plurality of servers through a load balancer that distributes the loads of the plurality of servers.

The remote network 110 is an example of an external network, external to the local network 100 provided in, for example, a home or a remote office. The information terminal 111 may be connected not only to the remote network 110, but also to a communication network 2 such as the interne by using a wide area network (WAN), a public wireless local area network (LAN), or the like from outside, for example. The following description is given as an example assuming that the information terminal 111 is connected to the remote network 110, which is a local network provided in the remote office that is remote from the local network 100.

The information terminal (first client apparatus) 111 is an information processing apparatus such as a tablet terminal, a smartphone, or a personal computer (PC) used by a user and having a function of a web browser. The information terminal 111 communicates with the application server 11 through the communication network 2. Further, the information terminal 111 may connect to and communicate with a particular relay server 13 among the plurality of relay servers 13*a*, 13*b*, 13*c*, and so forth through the communication network 2 and the load balancer 14.

The local network 100, for example, is a network such as an in-house LAN in which access from an external network such as the communication network 2 and the remote network 110 is restricted by a firewall or the like.

In FIG. 1, it is assumed that the service platform 12 and the secure box 15 are set to be communicable by, for example, a Message Queue Telemetry Transport (MQTT) protocol. Further, it is assumed that access from the information terminal 111, the relay server 13, and the like to the secure box 15, the information processing apparatus 101, the image forming apparatus 102, and the like in the local network 100 is prohibited.

The information processing apparatus 101 is a PC or the like connected to the local network 100 and provides a service such as a remote desktop service, for example. The image forming apparatus 102 is an electronic device connected to the local network 100 and provides a service such as a facsimile service.

The information processing apparatus 101 and the image forming apparatus 102 are examples of access destination terminals that are connected to the local network 100 and provide a specific service. The access destination terminal may be, for example, a projector (PJ), an interactive white board (IWB: a whiteboard having an electronic whiteboard function capable of intercommunication), a digital signage, or the like. Further, the electronic device may be, for example, an industrial machine, an imaging device, a sound collecting device, a medical device, a network home appliance, a smartphone, a tablet terminal, a game machine, a personal digital assistant (PDA), a digital camera, or the like.

The application server 11 is, for example, an information processing apparatus having the computer configuration or the system including a plurality of information processing apparatuses. The application server 11 includes a function of a web server that provides to the information terminal 111 and the like, web contents for using the electronic device such as the information processing apparatus 101 or the image forming apparatus 102 in the local network 100, for example, by using the communication system 1.

The service platform 12 is, for example, the information processing apparatus having the computer configuration or the system including the plurality of information processing apparatuses. The service platform 12 controls (manages) communication between the information terminal (first client apparatus) 111 and the secure box (second client apparatus) in cooperation with the application server 11. Further, the service platform 12 is provided with an authentication function for authenticating an information terminal 111, a user who uses the information terminal 111, and the secure box 15, and a management function for managing the secure box 15, and the like.

The functions of the application server 11 and the service platform 12 may be implemented by, for example, the communication management system 10 that may be implemented by one server or by more than one server. Further, since the application server 11 and the service platform 12 can have various system configurations, the application server 11 and the service platform 12 may be collectively referred to as a communication management system 10 without any particular distinction in the following description.

The relay server (server) 13 is, for example, an information processing apparatus having a computer configuration, or a system including a plurality of information processing apparatuses. The relay server 13 relays communication between the information terminal 111 and the secure box 15 (or the local network 100).

The load balancer 14 receives a request to the relay server 13 from the client terminal (for example, an information terminal 111 or a secure box 15) and distributes and transfers the received request to the plurality of relay servers 13. The load balancer 14 may use a load balancing service provided by a cloud service or the like outside the communication system 1.

The secure box (second client apparatus) 15 is, for example, a network-based device having the computer configuration and a communication function, or an information processing apparatus. The secure box 15 connects to the relay server 13 under the control of the communication management system 10 and relays the communication between the access source terminal (for example, the information terminal 111) and the access destination terminal (for example, the information processing apparatus 101 or the image forming apparatus 102).

As the number of client apparatuses such as the information terminal 111 and the secure box 15 increases in the communication system 1, the load on the relay server 13 increases. Therefore, as illustrated in FIG. 1, the load balancer 14 and the plurality of relay servers 13 are provided, and the load balancer 14 that receives the requests from the client terminals distributes and transfers the requests to the plurality of relay servers 13. As a result, it is possible to prevent the load from being concentrated on one relay server 13 while distributing the load over the plurality of relay servers 13.

However, since the load balancer 14 cannot maintain a session simply by distributing the requests to the plurality of relay servers 13, the load balancer 14 includes a session maintenance function (uniqueness guarantee function). For example, the load balancer 14 associates a request with a client terminal and a set of responses as one session and transfers the request to the same relay server 13. Thereby, for example, in the session established by the information terminal 111 with the relay server 13*a*, the request transmitted by the information terminal 111 is transferred to the relay server 13a every time. Similarly, in the establishment session of the secure box 15 with the relay server 13b, the request transmitted by the secure box 15 is forwarded to the relay server 13b every time.

However, in the communication system 1 illustrated in FIG. 1, when the information terminal 111 and the secure box 15 are not connected to the same relay server 13, the relay server 13 cannot relay the communication between the information terminal 111 and the secure box 15.

Therefore, the information terminal 111 according to the present embodiment transmits a request to the relay server 13 to the load balancer 14 and acquires identification information for identifying the particular relay server (for example, relay server 13a) selected by the load balancer 14. Further, the information terminal 111 includes a function of notifying the secure box 15 of the acquired identification information by using, for example, the function of the communication management system 10, e-mail, or chat.

As a result, the information terminal 111 can selectively connect to the relay server 13a by transmitting a request including the acquired identification information for identifying the relay server 13a to the load balancer 14. Further, the secure box 15 can selectively connect to the relay server 13a by transmitting a request including identification information for identifying the relay server 13a notified from the information terminal 111 to the load balancer 14. Therefore, the information terminal 111 and the secure box 15 are connected to the same relay server 13a and communicate with each other through the relay server 13a.

As described above, according to the present embodiment, in the communication system 1 in which the first client apparatus and the second client apparatus are connected to the same server to perform predetermined processing, the load is distributed to the plurality of servers.

Figure 2:
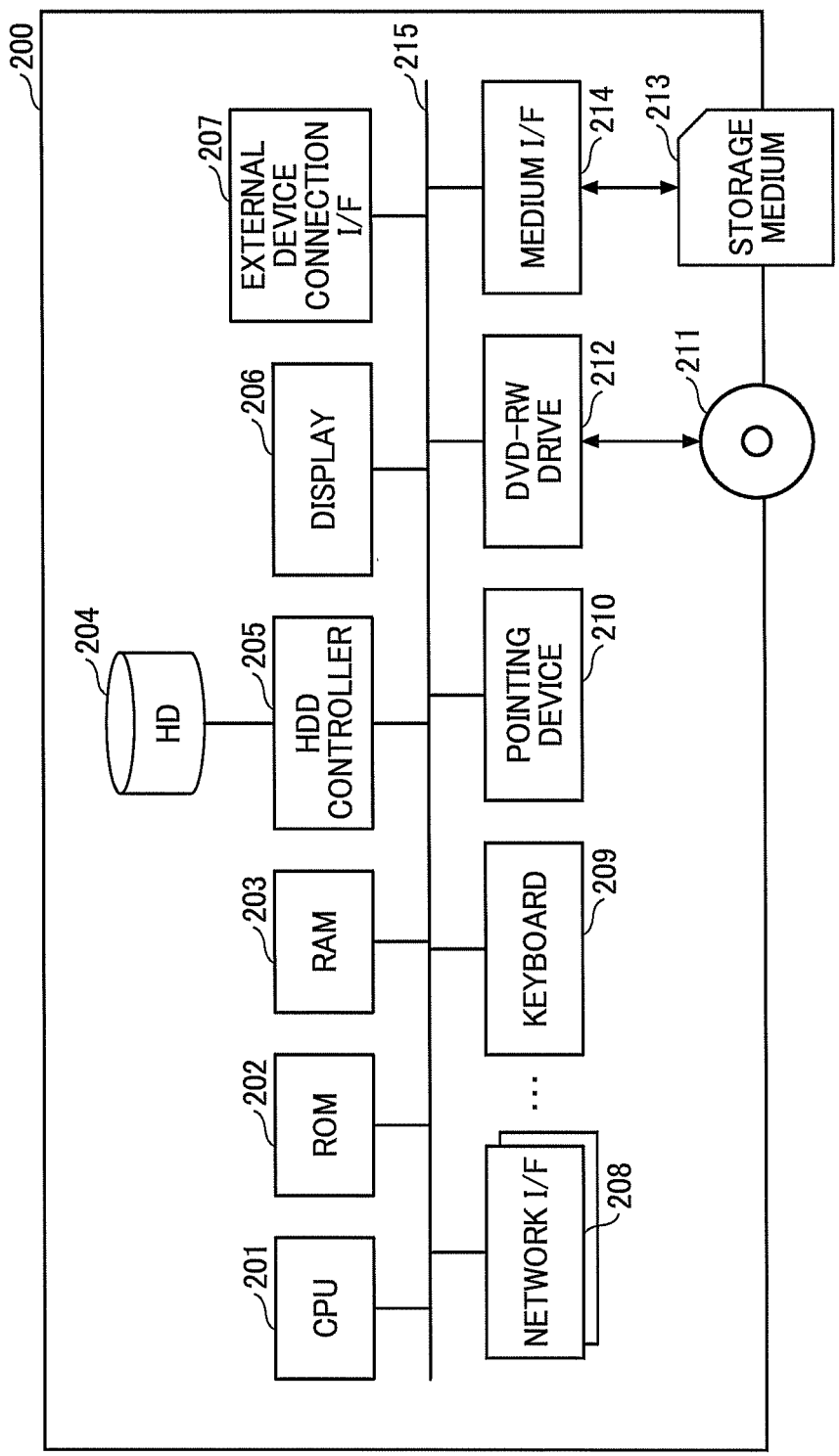
FIG. 2 is a block diagram illustrating an example of a hardware configuration of a computer according to embodiments of the present disclosure.

The secure box 15 and the information processing apparatus 101 are each implemented by, for example, a computer 200 having a hardware configuration as illustrated in FIG. 2. Further, the communication management system 10, the application server 11, the service platform 12, the relay server 13, and the load balancer 14 may each be implemented by one or more computers 200.

FIG. 2 is a block diagram illustrating an example of the hardware configuration of the computer according to the present embodiment. The computer 200 includes, for example, a central processing unit (CPU) 201, a read only memory (ROM) 202, a random access memory (RAM) 203, a hard disk (HD) 204, a hard disk drive (HDD) controller 205, a display 206, an external device connection interface (I/F) 207, one or more network I/Fs 208, a keyboard 209, a pointing device 210, a digital versatile disk rewritable (DVD-RW) drive 212, a medium I/F 214, a bus line 215, and the like as illustrated in FIG. 2.

The CPU 201 controls entire operation of the computer 200. The ROM 202 stores a program used for driving the computer 200, such as an initial program loader (IPL). The RAM 203 is used as, for example, a work area for the CPU 201. The HD 204 stores, for example, programs such as an operating system (OS), an application, and a device driver, and various data. The HDD controller 205 controls, for example, reading or writing of various data to and from the HD 204 according to the control of the CPU 201.

The display 206 displays various information such as a cursor, menu, window, character, or image. The display 206 may be provided outside the computer 200. The external device connection I/F 207 connects various external devices to the computer 200. One or more network I/Fs 208 are interfaces for data communication using, for example, a communication network 2, a local network 100, a remote network 110, or the like.

The keyboard 209 is an example of an input device provided with a plurality of keys for allowing a user to input characters, numerals, or various instructions. The pointing device 210 is an example of an input device that allows a user to select or execute a specific instruction, select a target for processing, or move a cursor being displayed. The keyboard 209 and the pointing device 210 may be provided outside the computer 200.

The DVD-RW drive 212 reads and writes various data from and to a DVD-RW 211, which is an example of a removable storage medium. The DVD-RW 211 is not limited to the DVD-RW and may be a digital versatile disk recordable (DVD-R) or the like. The medium I/F 214 controls reading or writing (storage) of data from and to a storage medium 213 such as a flash memory. The bus line 215 includes an address bus, a data bus, various control signals, and the like for electrically connecting each of above components.

The configuration of the client computer 200 illustrated in FIG. 2 is an example. The computer 200 may have any other configuration as long as the computer includes, for example, a CPU 201, a ROM 202, a RAM 203, one or more network I/Fs 208, and a bus line 215. Further, for example, the hardware configuration of the access destination terminal such as the image forming apparatus 102 may be any other configuration as long as the communication function and the computer configuration are included.

Figure 3:
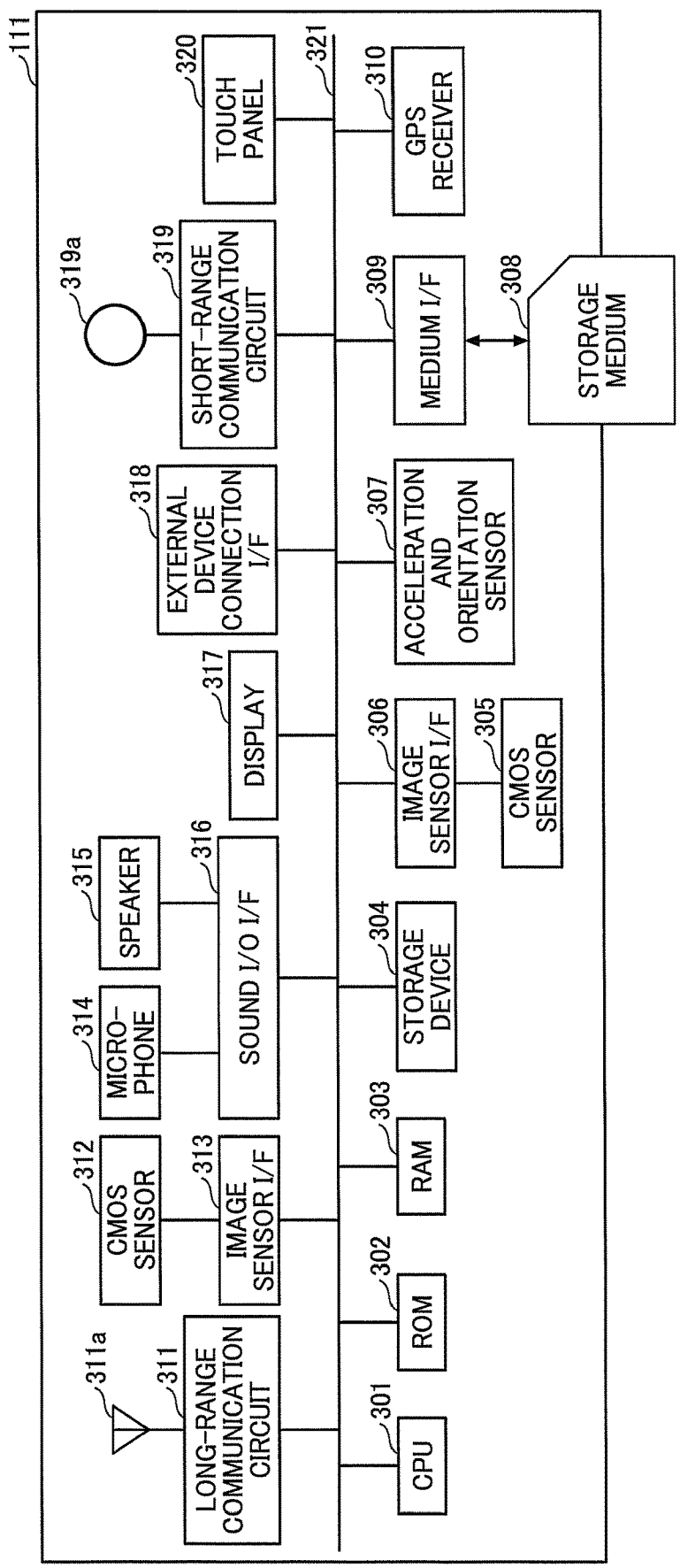
FIG. 3 is a block diagram illustrating an example of a hardware configuration of an information terminal according to embodiments of the present disclosure.

The information terminal 111 has a hardware configuration of the information terminal as illustrated in FIG. 3, as an example. Further, as another example, the information terminal 111 may have the hardware configuration of the computer 200 as illustrated in FIG. 2.

FIG. 3 is a block diagram illustrating an example of the hardware configuration of the information terminal according to the present embodiment. As illustrated in FIG. 3, the information terminal 111 includes a CPU 301, a ROM 302, a RAM 303, a storage device 304, a Complementary Metal Oxide Semiconductor (CMOS) sensor 305, an imaging element I/F 306, an acceleration and orientation sensor 307, a medium I/F 309 and a Global Positioning System (GPS) receiver 310.

The CPU 301 controls the operation of the entire information terminal 111 by executing a program. The ROM 302 stores, for example, a program used for starting the CPU 301 such as the IPL. The RAM 303 is used as a work area for the CPU 301. The storage device 304 is a large-capacity storage device that stores programs such as the OS and applications, various data, and the like, and is implemented by, for example, a Solid State Drive (SSD), a flash ROM, or the like.

The CMOS sensor 305 is an example of built-in imaging device that acquires image data by imaging a subject (mainly a self-portrait) under the control of the CPU 301. The information terminal 111 may include an imaging device such as a Charge Coupled Device (CCD) sensor instead of the CMOS sensor 305. The imaging element I/F 306 controls the drive of the CMOS sensor 305. The acceleration and orientation sensor 307 includes various sensors such as an electromagnetic compass for detecting geomagnetism, a gyrocompass, and an acceleration sensor. The medium I/F 309 controls reading or writing (storage) of data from and to a storage medium 308 such as a flash memory. The GPS receiver 310 receives a GPS signal (positioning signal) from a GPS satellite.

The information terminal 111 includes a long-range communication circuit 311, an antenna 311a of the long-range communication circuit 311, a CMOS sensor 312, an imaging element I/F 313, a microphone 314, a speaker 315, sound input/output (I/O) I/F 316, a display 317, and an external device connection I/F 318, a short-range communication circuit 319, an antenna 319a of the short-range communication circuit 319, and a touch panel 320.

The long-range communication circuit 311 communicates with other devices through, for example, a communication network. The CMOS sensor 312 is an example of a built-in imaging device configured to capture a subject under control of the CPU 301 to obtain image data. The imaging element I/F 313 is a circuit that controls driving of the CMOS sensor 312. The microphone 314 is a built-in circuit that converts sound into an electric signal. The speaker 315 is a built-in circuit that generates sound such as music or voice by converting an electric signal into physical vibration. The sound I/O I/F 316 processes sound wave signal input and output between the microphone 314 and the speaker 315 under the control of the CPU 301.

The display 317 is an example of display device such as a liquid crystal display or an organic electro luminescence (EL) for displaying an image of a subject, various icons, and the like. The external device connection I/F 318 is an interface for connecting various external devices. The short-range communication circuit 319 includes a circuit that performs short-range wireless communication. The touch panel 320 is an example of an input device that allows a user to operate the information terminal 111 by touching a screen of the display 317.

Further, the information terminal 111 includes a bus line 321. The bus line 321 includes an address bus, a data bus, or the like for electrically connecting each component such as the CPU 301 illustrated in FIG. 3.

A functional configuration of each device in the communication system 1 is described in the following.

The information terminal 111 implements a communication unit 401, an acquisition unit 402, a notification unit 403, a first communication control unit 404, a display control unit 405, and an operation reception unit 406, storage unit 407, and the like, for example, by a CPU 201 or a CPU 301 that executes a program. Note that at least a part of the above functional units may be implemented by hardware. Here, as an example, the following description is given assuming that the information terminal 111 has the hardware configuration of the computer 200 as illustrated in FIG. 2.

The communication unit 401 is implemented by, for example, an operating system (OS) executed by the CPU 201 and uses the network I/F 208 to connect the information terminal 111 to the remote network 110 or the communication network 2 to execute communication process with other devices.

The acquisition unit 402 is implemented by, for example, a web browser executed by the CPU 201, an application program having a function of the web browser (hereinafter, referred to as an application), or the like. The acquisition unit 402 sends a request addressed to the relay server 13 to the load balancer 14 and executes an acquisition process for acquiring identification information for identifying the particular relay server 13 selected by the load balancer.

For example, the acquisition unit 402 transmits the first connection request (WebSocket connection request) to the load balancer 14. When the first connection request does not include a valid cookie including identification information that identifies the relay server 13, the load balancer 14 may select the particular relay server 13 (for example, the relay server 13a) from the plurality of relay servers 13 and transfers the first connection request to the selected relay server 13.

In response to the first connection request, the relay server 13a transmits the first connection response (WebSocket connection response) that responds to the first connection request to the requesting information terminal 111 through the load balancer 14. The load balancer 14 adds a cookie including identification information for identifying the relay server 13a to the first connection response. Accordingly, the acquisition unit 402 receives the first connection response to which the cookie including the identification information for identifying the relay server 13a is added.

However, restrictions are provided on the use of the cookie added to the first connection response. Therefore, preferably, the acquisition unit 402 disconnects the WebSocket connection and transmits to the load balancer, a second connection request (WebSocket connection request) to which a cookie including identification information for identifying the relay server 13a is added. The load balancer 14 transfers the second connection request to the relay server 13a when the second connection request includes a valid cookie including identification information that identifies the relay server 13a. In response to the second connection request, the relay server 13a that has received the second connection request transmits a second connection response (WebSocket connection response) to the requesting information terminal 111 through the load balancer 14. Further, the relay server 13a includes a function of acquiring a cookie including identification information for identifying the relay server 13a, that is added to the second connection request and notifying the information terminal 111 of the acquired cookie with a message different from the second connection response. Accordingly, the acquisition unit 402 acquires the cookie including the identification information that identifies the relay server 13a in an easily available form.

The notification unit 403 is implemented by, for example, a web browser executed by the CPU 201, an application having a function of the web browser, or the like. The notification unit 403 executes a notification process for notifying the secure box (second client apparatus) of the identification information of the particular relay server 13 (for example, the relay server 13a) selected by the load balancer 14. For example, the notification unit 403 notifies the secure box 15 of the cookie including the identification information of the relay server 13a acquired by the acquisition unit 402 by using the communication management system 10. Alternatively, the notification unit 403 may notify the secure box 15 of the cookie including the identification information of the relay server 13a acquired by the acquisition unit 402 through other methods such as an email or chat.

The first communication control unit 404 is implemented by, for example, the web browser executed by the CPU 201, an application having a function of the web browser, or the like. The first communication control unit 404 executes a first communication control process requesting connection to the relay server 13 by using the cookie including the identification information acquired by the acquisition unit 402. For example, the first communication control unit 404 transmits to the load balancer 14, a WebSocket connection request to which the cookie including the identification information for identifying the relay server 13a acquired by the acquisition unit 402 is added. As a result, the first communication control unit 404 establishes a session with the secure box 15 through the relay server 13 for performing encrypted communication by, for example, WebSocket over Hypertext Transfer Protocol Secure (HTTPS).

The display control unit 405 is implemented by, for example, the web browser executed by the CPU 201, the application having the function of the web browser, or the like and executes a display control process for displaying a display screen transmitted from the communication management system 10, the secure box 15, or the like. The display control unit 405 also controls the reproduction of audio when the display screen includes audio data or the like.

The operation reception unit 406 is implemented by, for example, a web browser executed by the CPU 201, the application having the function of the web browser, or the like and executes an operation reception process for receiving an operation by the user or the like on the display screen displayed by the display control unit 405.

The storage unit 407 is implemented by, for example, a program (OS or the like) executed by the CPU 201 and a storage device such as the HD 204, and stores various information, data, programs, and the like.

Figure 4:
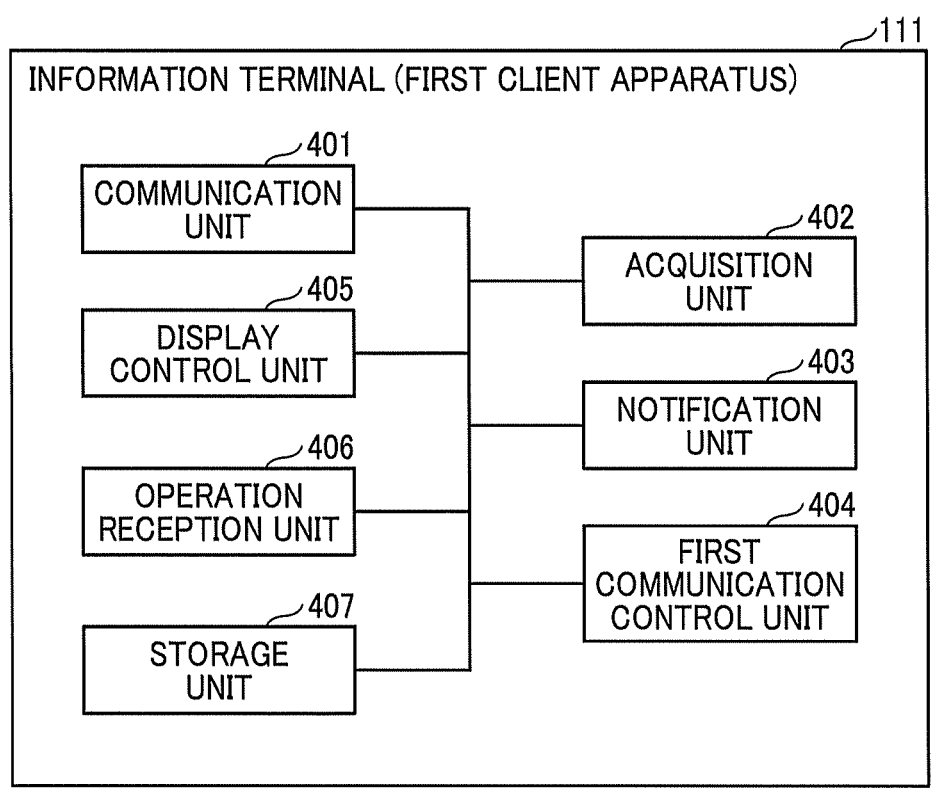
FIG. 4 is a block diagram illustrating a functional configuration of the information terminal according to embodiments of the present disclosure.
Figure 5:
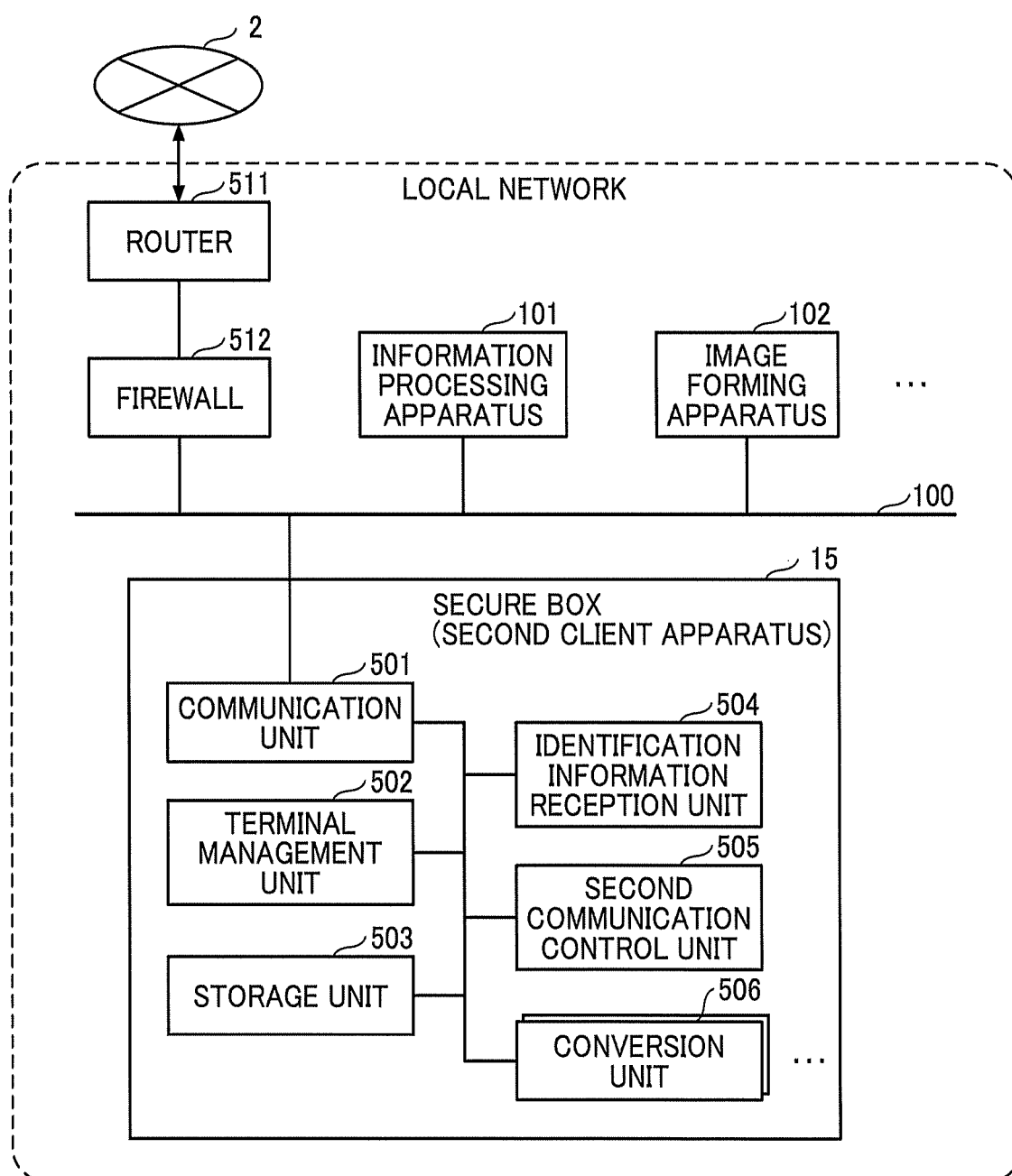
FIG. 5 is a block diagram illustrating a functional configuration of a secure box according to embodiments of the present disclosure.

FIG. 5 is a block diagram illustrating a functional configuration of the secure box according to the present embodiment. In the example of FIG. 5, the local network 100 is connected to the communication network 2 through a router 511 and a firewall 512. However, this is an example, and the functions of the router 511 and the firewall 512 may be included in the secure box 15. Further, in the example of FIG. 4, the information processing apparatus 101, the image forming apparatus 102, and the like, which are examples of access destination terminals, are connected to the local network 100.

The secure box 15 is implemented by executing a program on the CPU 201 or the like and includes, for example, a communication unit 501, a terminal management unit 502, a storage unit 503, an identification information reception unit 504, a second communication control unit 505, and one or more conversion units 506. Note that at least a part of the above functional units may be implemented by hardware.

The secure box 15 is an example of the second client apparatus. The second client apparatus may be a server or the like having the same functional configuration as the secure box 15 of FIG. 5.

The communication unit 501, for example, uses the network I/F 208 to connect the secure box 15 to the local network 100 and execute a communication process for communicating with another device.

The terminal management unit 502 is connected to the communication management system 10 through the communication unit 501, the firewall 512, the router 511, etc., so that communication is constantly established with the communication management system 10, for example, by a communication protocol such as MQTT. Further, the terminal management unit 502 stores and manages the secure box setting information and the like notified from the communication management system 10 in the storage unit 503 and the like.

The storage unit 503 is implemented by a program executed by the CPU 201, the HD 204, the HDD controller 205, and the like, and stores various information such as setting information of the secure box 15.

The identification information reception unit 504 executes an identification information reception process for receiving the identification information for identifying the relay server 13, which is notified from the information terminal (first client apparatus) 111. For example, the identification information reception unit 504 receives through the communication unit 501 and the terminal management unit 502, a cookie including identification information for identifying the relay server 13 that the information terminal 111 transmits to the secure box 15 through the communication management system 10. Alternatively, the identification information reception unit 504 may acquire from the e-mail or chat, the cookie including identification information for identifying the relay server 13 transmitted by the information terminal 111 by e-mail, chat, or the like.

The second communication control unit 505 executes a second communication control process for requesting the load balancer 14 to connect to the particular relay server 13, using the identification information received by the identification information reception unit 504 to identify the particular relay server 13. Further, the second communication control unit 505 establishes a session for performing encrypted communication with the information terminal 111 through the relay server 13, for example, by using WebSocket over HTTPS or the like.

One or more conversion units 506, if necessary, performs protocol conversion between the access source terminal (information terminal 111, etc.) and the service provided by the access destination terminal (information processing apparatus 101, image forming apparatus 102, etc.).

Figure 6:
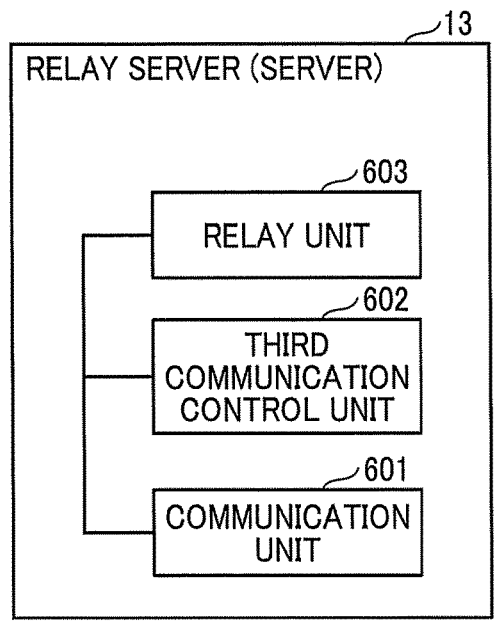
FIG. 6 is a block diagram illustrating a functional configuration of a relay server according to embodiments of the present disclosure.

FIG. 6 is a block diagram illustrating a functional configuration of the relay server according to the present embodiment. The relay server 13 implements the communication unit 601, the third communication control unit 602, the relay unit 603, and the like by executing a program on the CPU 201, for example. Note that at least a part of the above functional units may be implemented by hardware.

The communication unit 601 executes a communication process for communicating with the load balancer 14 by using, for example, the network I/F 208 or the like.

When the connection request transmitted by the information terminal 111 includes the identification information that identifies the relay server 13, the third communication control unit 602 notifies the information terminal 111 of the identification information that identifies the relay server 13 by a message different from the connection response that responds to the connection request.

For example, the third communication control unit 602 determines whether a valid cookie including the identification information for identifying the relay server 13 is added to the WebSocket connection request transmitted by the information terminal 111. Further, when a valid cookie including the identification information for identifying the relay server 13 is added to the connection request of the WebSocket, the third communication control unit transmits the cookie with a message different from the connection response of the WebSocket to the information terminal 111.

In addition, the third communication control unit 602 establishes a session for encrypted communication by WebSocket over HTTPS or the like, to a client apparatus such as an information terminal 111 or a secure box 15 that requests a connection to the relay server 13.

The relay unit 603 relays the communication between the information terminal 111 connected to the relay server 13 and the secure box 15. For example, the relay unit 603 uses the same session ID to tunnel between the first session established with the secure box 15 and the second session established with the information terminal 111 and relays the first session and the second session.

Figure 7:
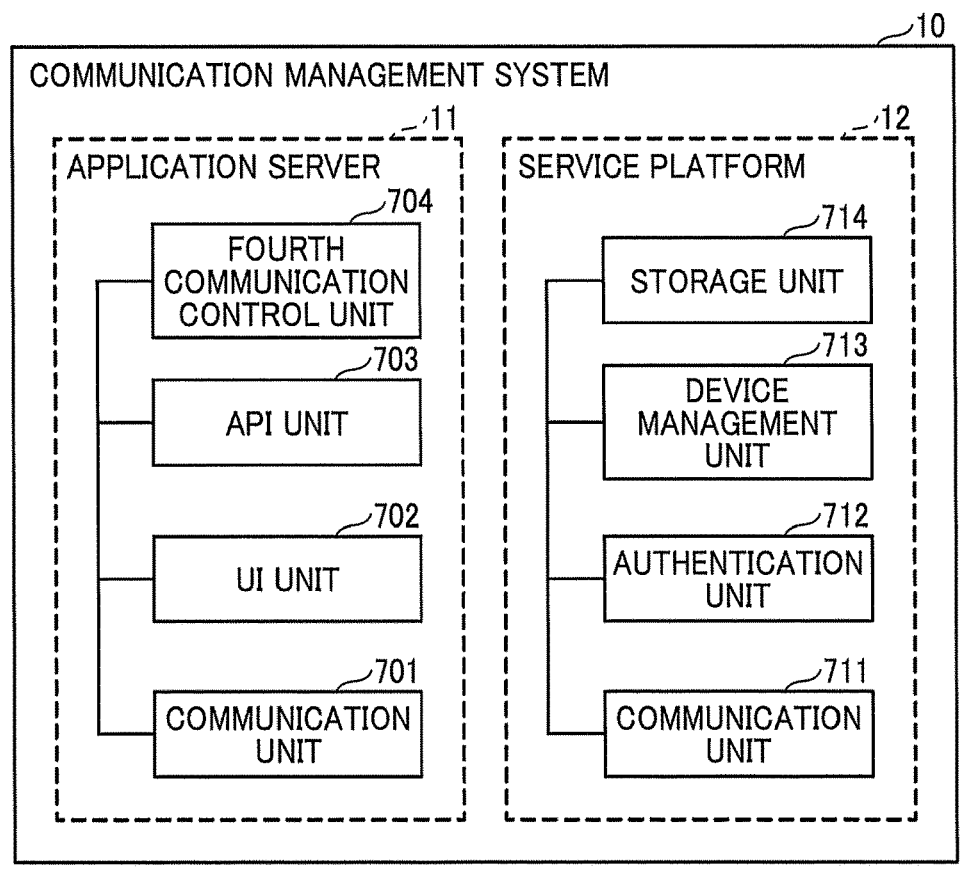
FIG. 7 is a diagram illustrating an example of a functional configuration of a communication management system according to embodiments of the present disclosure.

FIG. 7 is a diagram illustrating an example of a functional configuration of the communication management system according to the present embodiment. The application server 11 is implemented by executing a program on one or more computers 200 and includes a communication unit 701, a user interface (UI) unit 702, an application programming interface (API) unit 703, a fourth communication control unit 704, and the like. Further, the service platform 12 is implemented by executing a program on one or more computers 200 and includes a communication unit 711, an authentication unit 712, a device management unit 713, a storage unit 714, and the like. Note that at least a part of the above functional units may be implemented by hardware.

The communication unit 701 connects the application server 11 to the communication network 2 or the like by using the network I/F 208 or the like and executes a communication process for communicating with another device such as the information terminal 111 or the service platform12.

The UI unit 702 functions as a web server that provides a web content that displays a display screen for using a service (for example, a remote access service or the like) provided by the communication management system 10 to the client apparatus such as the information terminal 111.

The API unit 703 provides a Web API for using a function provided by the communication management system 10 to the client apparatus such as the information terminal 111 (for example, a function of transmitting a cookie to the secure box 15). The fourth communication control unit 704 executes a fourth communication control process that includes, for example, a process in which the UI unit 702 connects the information terminal 111 and the connection destination secure box 15 to the relay server 13 in response to the connection request received from the information terminal 111.

The communication unit 711 connects the service platform 12 to the communication network 2 or the like using the network I/F 208 or the like and executes a communication process for communicating with another device such as the application server 11.

The authentication unit 712 authenticates the user registered in the communication system 1, the client terminal (for example, the information terminal 111, the secure box 15, etc.), and the like. The authentication unit 712 may authenticate within the service platform12 or may authenticate using an external authentication server or the like.

The device management unit 713 connects to the secure box 15 so that communication is constantly established with the secure box 15, for example, by a communication protocol such as MQTT, in response to a connection request transmitted by the secure box 15, for example, when the secure box 15 is activated. Accordingly, each functional configuration included in the communication management system 10 communicates with the secure box 15 through the device management unit 713. Further, the device management unit 713 stores and manages the information of one or more secure boxes 15 included in the communication system 1 in the storage unit 714 or the like.

The storage unit 714 is implemented by, for example, a program executed by the CPU 201, the HD 204, the HDD controller 205, or the like, and stores various information managed by the communication system 1.

The functional configuration of the communication management system 10 illustrated in FIGS. 4 to 7 is an example. Each functional configuration included in the communication management system 10 may be implemented by the program executed by any computer 200 included in the communication management system 10. Further, the relay server 13 may be provided inside the communication management system 10.

In the present embodiment, the load balancer 14 may be, for example, a general-purpose load balancer, or a load balancer system provided by a cloud service or the like.

In response to receiving, for example, a request from the client apparatus that does not include the identification information for identifying the relay server 13, the load balancer 14 selects a particular relay server 13 from the plurality of relay servers 13 to transfers the request to. For example, the load balancer 14 may monitor the load of the plurality of relay servers 13 and select the relay server 13 having the lightest load as the particular relay server 13 to transfer the request. However, in the present embodiment, any method may be used in which the load balancer 14 selects the particular relay server 13 to transfer the request to. Further, the load balancer 14 transfers the request received from the client apparatus to the particular relay server 13.

On the other hand, when the load balancer 14 receives a request from the client terminal including the identification information that identifies the particular relay server 13, the load balancer 14 transfers the request to the particular relay server 13.

The load balancer 14 may be an external device or external system of the communication system 1 or an internal device or internal system of the communication system 1 as long as the load balancer 14 includes the above functions.

A description is now given of a load distribution process, according to the present embodiment.

Figure 8:
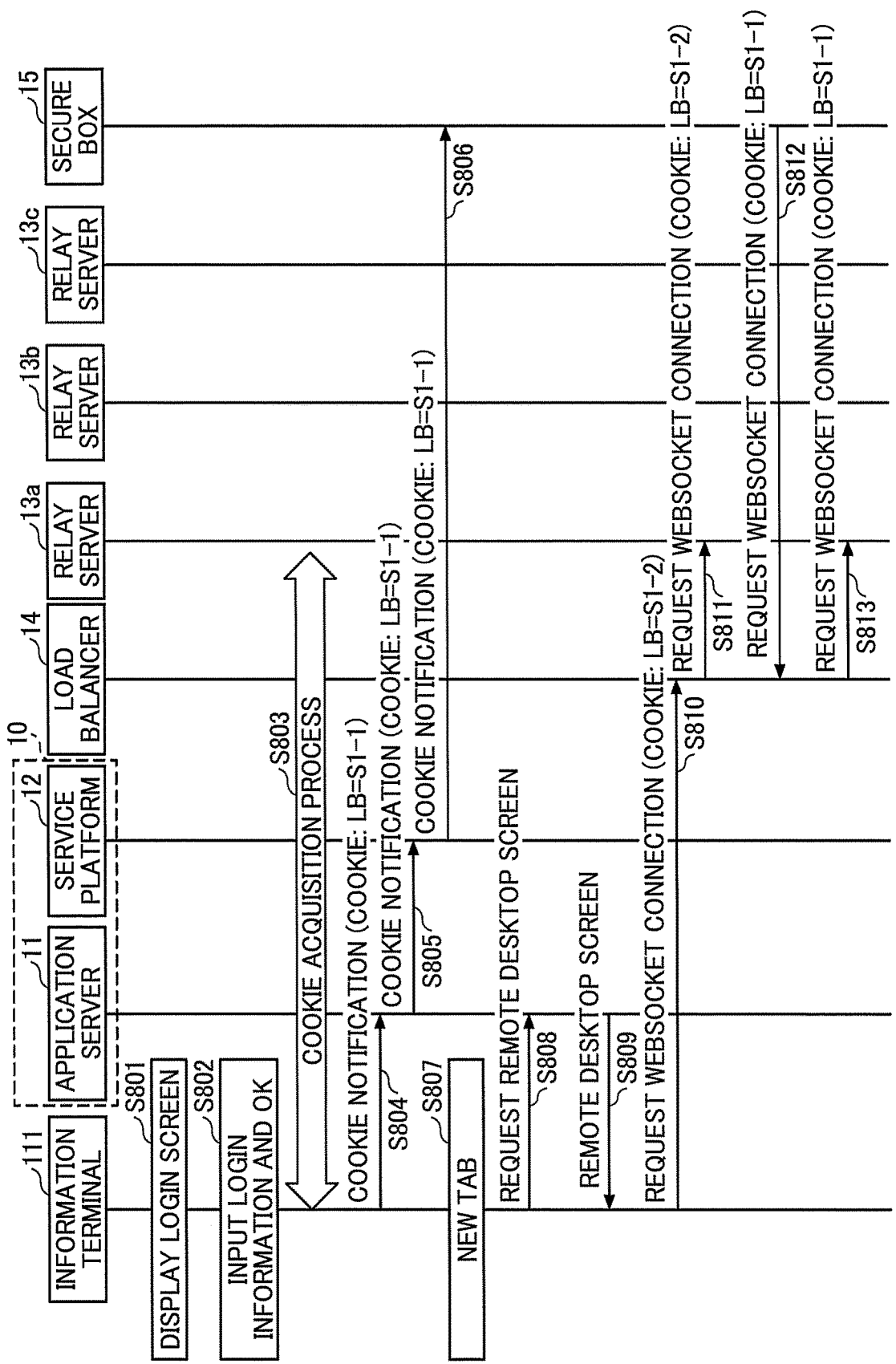
FIG. 8 is a sequence diagram illustrating an example of a connection process according to a first embodiment of the present disclosure.

FIG. 8 is a sequence diagram illustrating an example of a connection process according to a first embodiment. This process is an example of the connection process for the information terminal 111 (an example of the first client apparatus) and the secure box 15 (an example of the second client apparatus) to connect to a particular relay server 13 among the plurality of relay servers 13 through the load balancer 14.

In steps S801 and S802, the display control unit 405 of the information terminal 111 displays a login screen and the operation reception unit 406 receives an input of login information by a user. When the login is successful in this process, the communication system 1 executes the process of step S803 and after.

In step S803, the acquisition unit 402 of the information terminal 111 transmits a request addressed to the relay server 13 to the load balancer 14 and the load balancer 14 executes a cookie acquisition process for acquiring a cookie including identification information that identifies the particular relay server selected by the load balancer 14.

Figure 9:
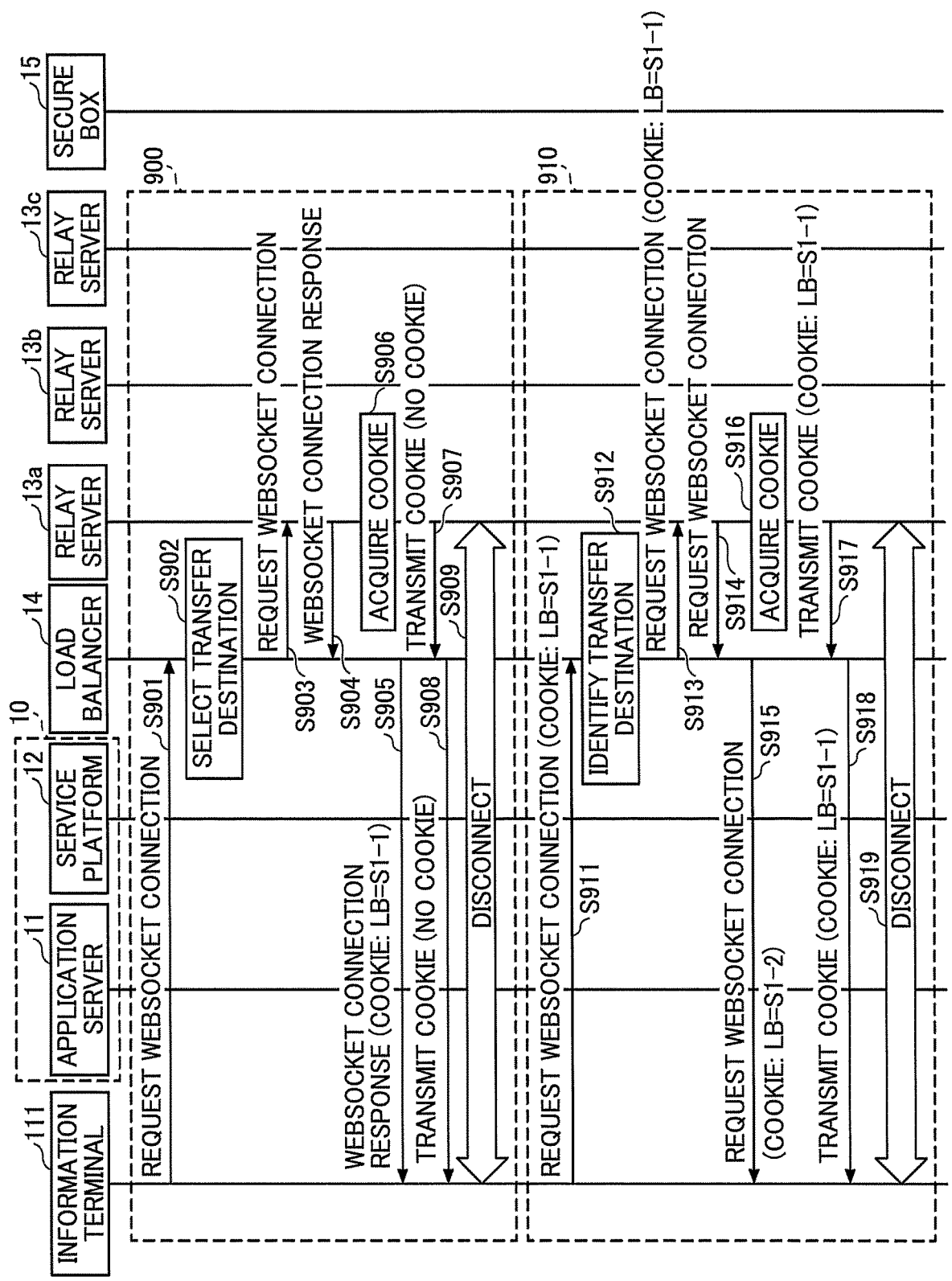
FIG. 9 is a sequence diagram illustrating an example of a cookie acquisition process according to the first embodiment of the present disclosure.

FIG. 9 is a sequence diagram illustrating an example of a cookie acquisition process according to the first embodiment. This process is an example of the cookie acquisition process executed by the communication system 1 in step S803 of FIG. 8.

In step S901, the acquisition unit 402 of the information terminal 111 transmits to the load balancer 14, a WebSocket connection request (request) requesting a WebSocket connection to the relay server 13. Here, it is assumed that the request transmitted by the information terminal 111 does not include the cookie including the identification information that identifies the relay server 13.

In step S902, when the received request does not include a valid cookie that includes identification information that identifies the relay server 13, the load balancer 14 selects a particular relay server 13 from a plurality of relay servers 13 to transfer the request. In the present embodiment, any method may be used for the load balancer 14 to select the particular relay server 13 from among the plurality of relay servers 13 to transfer the request. Here, as an example, the following description is given assuming that the load balancer 14 has selected the relay server 13a having the lightest load as the particular relay server 13 for forwarding the request.

In step S903, the load balancer 14 transfers the WebSocket connection request received from the information terminal 111 to the selected relay server 13a.

In step S904, in response to the WebSocket connection request, the third communication control unit 602 of the relay server 13a transmits a WebSocket connection response to the load balancer 14.

In step S905, the load balancer 14 adds the cookie including identification information (LB=s1-1) for identifying the relay server 13a to the WebSocket connection response received from the relay server 13a, and transfers to the requesting information terminal 111. Here, in "LB=s1-1," "s1" is the identification information for identifying the relay server 13a, and the "-1" is, for example, a suffix to be updated for each connection, or the like.

In steps S906 to S908, the third communication control unit 602 of the relay server 13a acquires the cookie added to the request received in step S903 and transmits to the requesting information terminal 111 through the load balancer 14. Here, since the WebSocket connection request received in step S903 does not include cookie as described above, the third communication control unit 602 transmits, for example, information indicating that there is no cookie to the information terminal 111. The third communication control unit 602 may omit (cancel) the processes of steps S907 and S908 when the WebSocket connection request received in step S903 does not include cookie as described above.

In step S909, the acquisition unit 402 of the information terminal 111 disconnects the eb Socket connection. By the process 900 including steps S901 to S909, the WebSocket connection response to which the cookie including the identification information for identifying the relay server 13a is received. However, the cookie (a third party cookie) added by the relay server 13a cannot be acquired by JAVASCRIPT (registered trademark) and cannot be displayed even in the developer mode, so it is difficult to acquire the cookie from the received WebSocket connection response. Therefore, in the communication system 1 according to the present embodiment, the process 910 including steps S911 to S919 is further executed.

In step S911, the acquisition unit 402 of the information terminal 111 transmits to the load balancer 14, a WebSocket connection request requesting a new WebSocket connection to the relay server 13. Here, the cookie including the identification information for identifying the relay server 13a, which is added to the WebSocket connection response received in step S905, is automatically added to the request transmitted by the information terminal 111.

In step S912, since the received request includes a cookie including identification information for identifying the relay server 13, the load balancer 14 identifies the transfer destination relay server 13a by the identification information included in the cookie.

In step S913, the load balancer 14 transfers the WebSocket connection request received from the information terminal 111 to the relay server 13a.

In step S914, in response to the WebSocket connection request, the third communication control unit 602 of the relay server 13a transmits a WebSocket connection response to the load balancer 14.

In step S915, the load balancer 14 adds a cookie including identification information (LB=s1-2) for identifying the relay server 13a to the WebSocket connection response received from the relay server 13a, and transfers to the requesting information terminal 111. At this time, the load balancer 14 leaves "LB=s1-2", which is the identification information of the relay server 13a, as it is, and updates the suffix "-2" for each connection.

In the above description, in order to facilitate the explanation, the values of the cookie added by the load balancer 14 are set to "s1-1" and "s1-2", but in reality, each cookie has a globally unique identifier such as a Universally Unique Identifier (UUID). The same applies to the following description.

In steps S916 to S918, the third communication control unit 602 of the relay server 13a acquires the cookie added to the request received in step S913 and transmits to the requesting information terminal 111 through the load balancer 14. As described above, the third communication control unit 602 sends the cookie including the identification information for identifying the relay server 13a included in the WebSocket connection request with a message different from the WebSocket connection response and transmits to the request source information terminal 111.

In step S919, the acquisition unit 402 of the information terminal 111 disconnects the WebSocket connection.

By the above process, the acquisition unit 402 of the information terminal 111 easily acquires the cookie including the identification information that identifies the relay server 13a selected by the load balancer 14 among the plurality of relay servers 13 in an available format. Returning to FIG. 8, the description of the connection process according to the first embodiment is continued.

In steps S804 to S806, the notification unit 403 of the information terminal 111 transmits the cookie including the identification information (LB=s1-1) for identifying the relay server 13a acquired in step S918 of FIG. 9 to the secure box 15 through the communication management system 10.

For example, the notification unit 403 requests the transfer of the cookie by using the API provided by the API unit 703 of the application server 11. The API unit 703 of the application server 11 transmits the received cookie to the secure box 15 by using the device management unit 713 of the service platform 12.

In step S807, the user who uses the information terminal 111 opens a new tab of the web browser and performs an operation of remote desktop.

In step S808, the display control unit 405 of the information terminal 111 requests the application server 11 to display a remote desktop screen. In response to the request for the remote desktop screen, in step S809, the UI unit 702 of the application server 11 causes the information terminal 111 to display the remote desktop screen.

In step S810, the first communication control unit 404 of the information terminal 111 transmits to the load balancer 14, a WebSocket connection request requesting a new WebSocket connection to the relay server 13. In the request transmitted by the information terminal 111, the cookie including the identification information (LB=s1-2) for identifying the relay server 13a, which is added to the WebSocket connection response received in step S915, is automatically added.

In step S811, the load balancer 14 transfers the WebSocket connection request to the relay server 13a according to the identification information (LB=s1-2) of the relay server 13a included in the WebSocket connection request.

In step S812, the second communication control unit 505 of the secure box 15 transmits to the load balancer 14, for example, a WebSocket connection request requesting a WebSocket connection to the relay server 13 in parallel with the processes of steps S807 to S811. At this time, the second communication control unit 505 adds the cookie including the identification information (LB=s1-1) for identifying the relay server 13a notified in step S806 to the WebSocket connection request.

By the above processing, the information terminal 111 and the secure box 15 are selectively connected to the same relay server 13a among the plurality of relay servers 13. Also, in the communication after the above processing, by adding the identification information (LB=s1-1 or s1-2) that identifies the relay server 13a to the request transmitted to the load balancer 14, the information terminal 111 and the secure box 15 are connected to the relay server 13a.

As described above, according to the present embodiment, in the communication system 1 in which the information terminal 111 and the secure box 15 are connected to the same relay server 13 for communication, distribution of the load to the plurality of relay servers 13 is facilitated.

In the first embodiment, the notification unit 403 of the information terminal 111 notifies the secure box 15 of the cookie including the identification information that identifies the relay server 13 acquired by the acquisition unit 402, using the API provided by the communication management system 10. This is an example, and the notification unit 403 may notify the secure box 15 of the cookie acquired by the acquisition unit 402 using, for example, MQTT, e-mail, chat, or the like.

Figure 10:
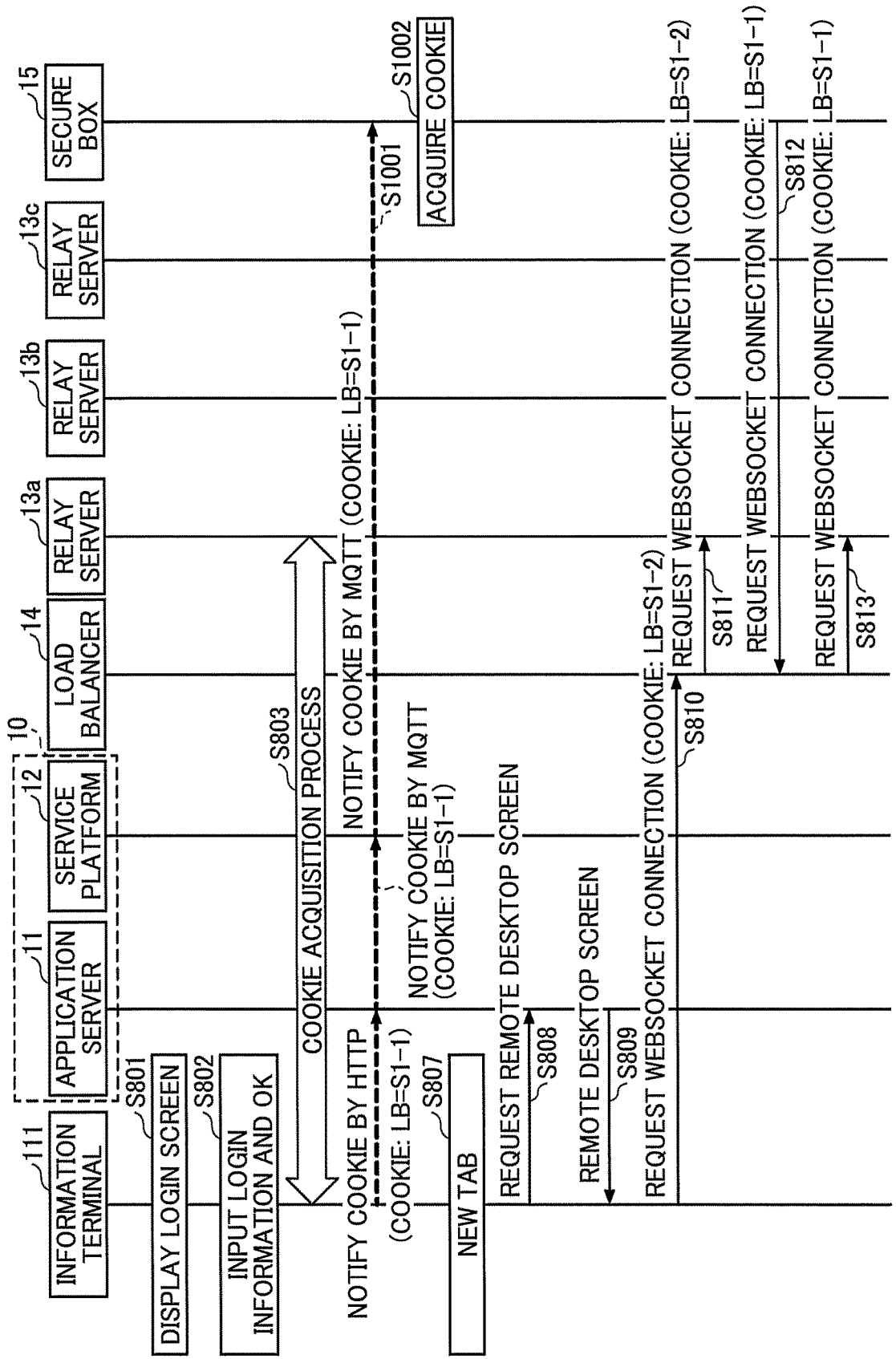
FIG. 10 is a sequence diagram illustrating an example of a connection process according to a second embodiment of the present disclosure.

FIG. 10 is a sequence diagram illustrating an example of a connection process according to a second embodiment. Of the process illustrated in FIG. 10, the process of steps S801 to S803 and S807 to S813 are the same as the connection process according to the first embodiment described with reference to FIG. 8. The differences are mainly described in the following.

In step S1001, the notification unit 403 of the information terminal 111 notifies the secure box 15 of the cookie including the identification information for identifying the relay server 13a acquired by the acquisition unit 402 in step S918 of FIG. 9 through the communication management system 10 using MQTT. The notification unit 403 may notify the secure box 15 of the cookie including the identification information that identifies the relay server 13a, for example, by e-mail or chat.

In step S1002, the identification information reception unit 504 of the secure box 15 acquires the cookie including the identification information for identifying the relay server 13a received from the information terminal 111.

As described above, the notification unit 403 of the information terminal 111 notifies the secure box 15 of the cookie including the identification information that identifies the relay server 13 by various methods.

Figure 11:
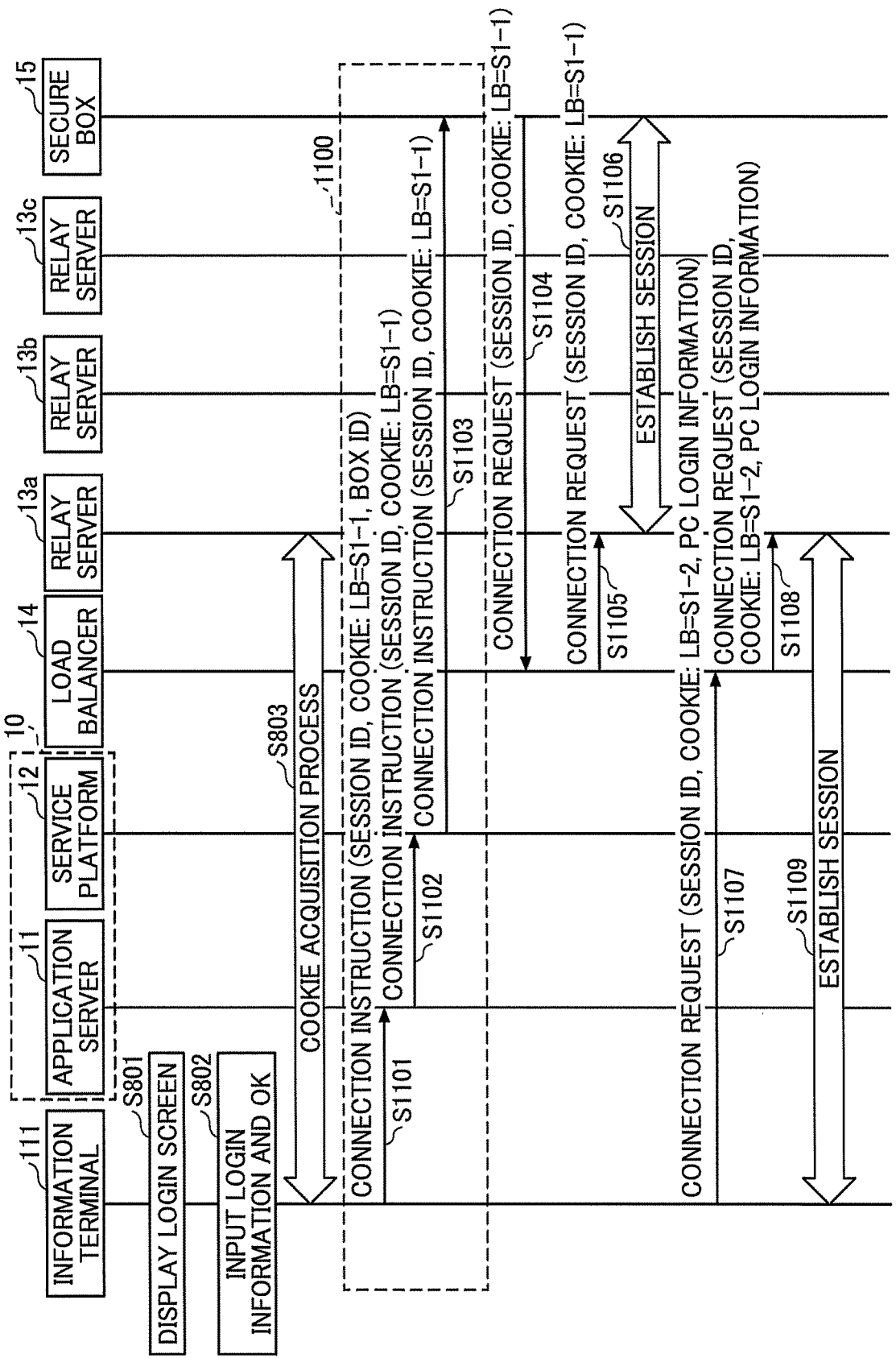
FIG. 11 is a first sequence diagram illustrating a specific example of the connection process according to the second embodiment.
Figure 12:
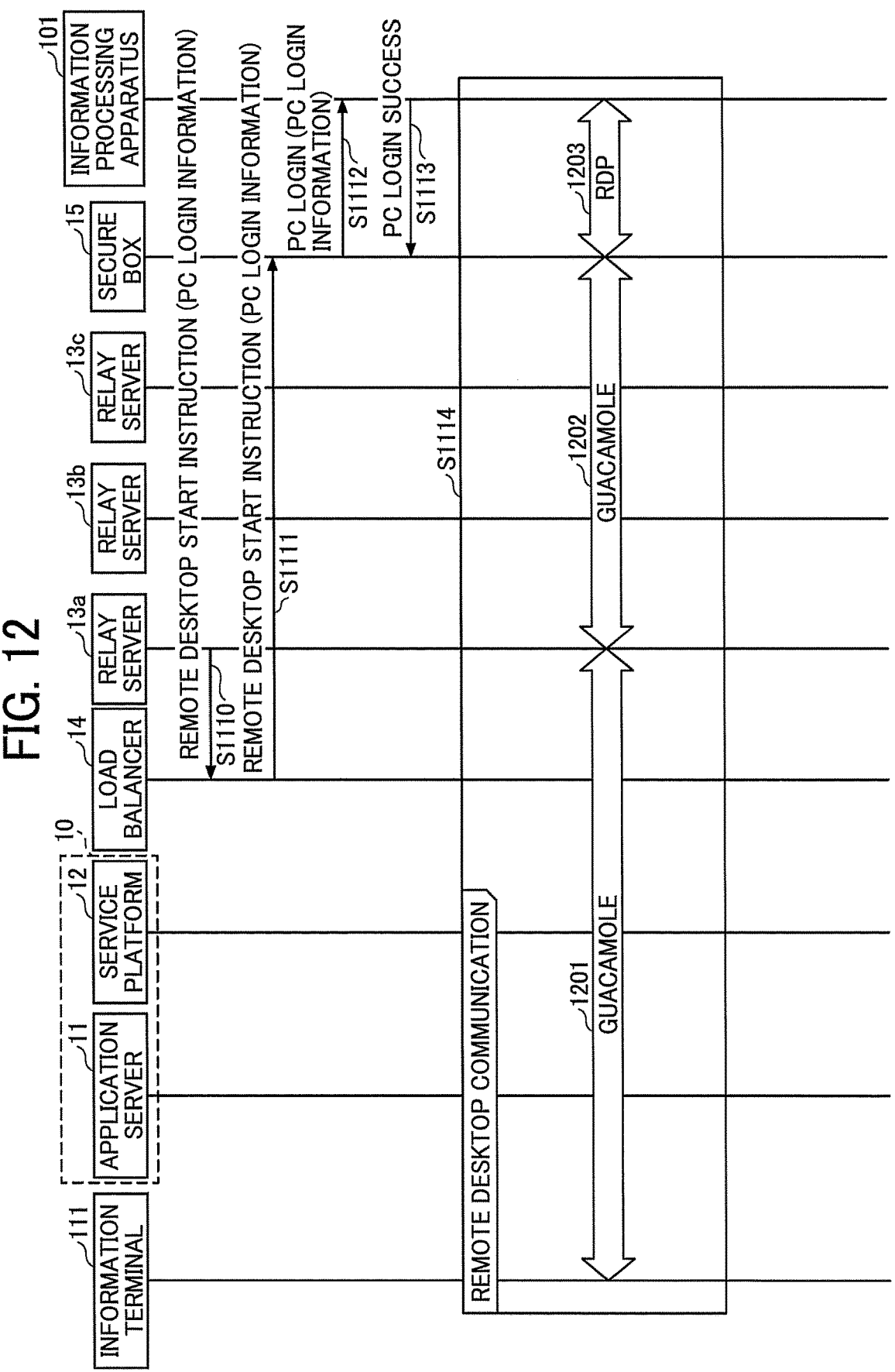
FIG. 12 is a second sequence diagram illustrating a specific example of the connection process according to the second embodiment.

FIGS. 11 and 12 are sequence diagrams illustrating specific examples of the connection process according to the second embodiment. Since the process of steps S801 to S803 of FIG. 11 are the same as the connection process according to the first embodiment described with reference to FIG. 8, the description thereof is omitted here.

In step S1101, the information terminal 111 transmits the connection instruction to the application server 11. The connection instruction includes, for example, a cookie including identification information (LB=s1-1) for identifying the relay server 13a acquired by the acquisition unit 402 in step S918 of FIG. 9, and a session ID and the like acquired from the communication management system 10. When the communication system 1 includes a plurality of secure boxes 15, the connection instruction may include identification information (hereinafter, referred to as box ID) for identifying the secure boxes.

In steps S1102 and S1103, when the UI unit 702 of the application server 11 receives the connection instruction from the information terminal 111, the fourth communication control unit 704 transmits the received connection instruction to the secure box 15 through the device management unit 713 of the service platform 12. The process 1100 including steps S1101 to S1103 is a specific example of the process of step S1001 in FIG. 10.

In step S1104, the second communication control unit 505 of the secure box 15 acquires the cookie and session ID included in the connection instruction received from the communication management system 10. Further, the second communication control unit 505 adds the acquired cookie (LB=s1-1) to the connection request including the acquired session ID and transmits the acquired cookie (LB=s1-1) to the load balancer 14.

In step S1105, the load balancer 14 transfers the connection request received from the secure box 15 to the relay server 13a according to the identification information (LB=s1-1) of the relay server 13a included in the connection request. In step S1106, a session is established between the relay server 13a and the secure box 15.

In step S1107, the first communication control unit 404 of the information terminal 111 transmits a connection request including the cookie (LB=s1-2), session ID, PC login information, etc. acquired by the acquisition unit 402 to the load balancer 14. The PC login information is for logging in to the remote desktop service provided by the information processing apparatus 101.

In step S1108, the load balancer 14 transfers the connection request received from the information terminal 111 to the relay server 13a according to the identification information (LB=s1-2) of the relay server 13a included in the connection request. In step S1109, a session is established between the relay server 13a and the information terminal 111.

By the above process, the relay server 13a causes the information terminal 111, which has established a session with the relay server 13a, and the secure box 15 to participate in the same session by using the same session ID. Accordingly, the relay server 13a relays the communication between the information terminal 111 and the secure box 15.

Following the above process, in steps S1110 and S1111 of FIG. 12, the third communication control unit 602 of the relay server 13a issues a remote desktop start instruction including the PC login information to the secure box 15 through the load balancer 14.

In step S1112, the conversion unit 506 of the secure box 15 transmits the PC login information included in the received remote desktop start instruction to the information processing apparatus 101 that provides the remote desktop service.

In response to a successful login to the remote desktop service provided by the information processing apparatus 101 in step S1113, remote desktop communication is performed between the information terminal 111 and the information processing apparatus 101 in step S1114.

For example, the relay unit 603 of the relay server 13a relays the data 1201 transmitted and received by the information terminal 111 and the data 1202 transmitted and received by the secure box 15 to each other through the load balancer 14 using a protocol such as guacamole.

Further, the conversion unit 506 of the secure box 15 converts the guacamole protocol data transmitted by the information terminal 111 into, for example, Remote Desktop Protocol (RDP) data, and transmits the data to the information processing apparatus 101. Further, the conversion unit 506 of the secure box 15 converts the RDP protocol data transmitted by the information processing apparatus 101 into guacamole protocol data and transmits the data to the information terminal 111.

In the above process, the information terminal 111 and the secure box 15 transmit and receive data to and from each other through the relay server 13a by transmitting data by adding a cookie including the identification information for identifying the relay server 13a.

In the above process, RDP may be another protocol such as Virtual Network Computing (VNC). Similarly, the guacamole protocol may be another protocol.

The information terminal 111 and the secure box 15 in each of the above embodiments are the examples of the first client apparatus and the second client apparatus that are connected to the same server (relay server 13) to perform predetermined processing (communication). Further, the plurality of relay servers 13a, 13b, 13c, and so forth are examples of the plurality of servers. Further, the communication system (an example of the load balancing system) 1 is an example of a system in which the first client apparatus and the second client apparatus are connected to the same server to perform predetermined processing.

As described above, according to each embodiment of the present disclosure, in a system in which the first client apparatus and the second client apparatus are connected to the same server to perform predetermined processing, distribution of load to a plurality of servers is facilitated.

The apparatuses or devices described in one or more embodiments are just one example of plural computing environments that implement the one or more embodiments disclosed herein. In some embodiments, communication management system 10 includes multiple computing devices, such as a server cluster. The plurality of computing devices is configured to communicate with one another through any type of communication link, including a network, shared memory, etc., and perform the processes disclosed herein. Similarly, the relay server 13 or load balancer 14 may include a plurality of computing devices configured to communicate with each other.

Further, the information terminal 111, the secure box 15, the relay server 13, and the load balancer 14 can be configured to share, for example, the processes illustrated in FIGS. 8 to 12 in various combinations. Further, each component included in the communication management system 10 may be integrated into selected server or may be distributed to a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A load balancing system comprising:
a first client apparatus and a second client apparatus each of which communicates with a particular server among a plurality of servers through a load balancer that distributes load of the plurality of servers, the first client apparatus including a circuitry configured to, in a state in which the first client apparatus and the second client apparatus are not connected via the particular server and a communication between the first client apparatus and the second client apparatus is not established:
transmit to the particular server via the load balancer, a connection request including first identification information for identifying the particular server,
acquire, from the load balancer, second identification information for identifying the particular server selected by the load balancer based on the first identification information from among the plurality of servers,
receive the first identification information from the particular server, the first identification information being acquired by the particular server from the connection request transmitted by the circuitry of the first client apparatus,
notify the second client apparatus of the first identification information, and
request the load balancer to connect to the particular server using the second identification information, and
wherein a circuitry of the second client apparatus is configured to request the load balancer to connect to the particular server using the first identification information.

2. The load balancing system of claim 1, wherein
the particular server comprises circuitry configured to, in response to the connection request including the first identification information transmitted by the first client apparatus, transmit the first identification information to the first client apparatus by a message different from a connection response to the connection request.

3. The load balancing system of claim 2, wherein
the circuitry of the first client apparatus is further configured to:
transmit to the load balancer, a first connection request requesting a connection to one of the plurality of servers;
receive a first connection response including the first identification information from the load balancer;
transmit to the load balancer, a second connection request including the second identification information; and
acquire the first identification information included in the message received from the load balancer.

4. The load balancing system of claim 1, wherein a circuitry of the load balancer is configured to:
in response to a request from the first client apparatus that does not include the first identification information, select the particular server from the plurality of servers to which the request is to be transferred and transfer the request to the particular server; and
in response to a request from the first client apparatus or the second client apparatus including the first or the second identification information, transfer the request to the particular server.

5. The load balancing system of claim 1, wherein
a circuitry of the particular server is further configured to relay communication between the first client apparatus that requests the load balancer to connect to the particular server and the second client apparatus using the first or the second identification information.

6. The load balancing system of claim 1 further comprising:
a communication management system that manages communication between the first client apparatus and the second client apparatus, and
the circuitry of the first client apparatus is further configured to notify the second client apparatus of the first identification information through the communication management system.

7. The load balancing system of claim 1, wherein
in response to receiving the connection request transmitted by the first client apparatus with a cookie including the first identification information having been set, a circuitry of the particular server is further configured to transmit the cookie including the first identification information to the first client apparatus with a message different from a connection response to the connection request.

8. The load balancing system of claim 7, wherein
the circuitry of the first client apparatus is further configured to:
transmit to the load balancer, a first connection request for requesting a connection to the server;
receive from the load balancer, a first connection response to which the cookie including the first identification information is attached;
transmit to the load balancer, a second connection request in which the cookie including the second identification info' nation is set;
acquire the cookie including the first identification information included in the message received from the load balancer; and
notify the second client apparatus of the cookie including the first identification information.

9. A load balancing method executed by a first client apparatus included in a load balancing system, the load balancing system including the first client apparatus and a second client apparatus each of which communicates with a particular server of a plurality of servers, through a load balancer that distributes load of the plurality of servers, the method including, before the first client apparatus and the second client apparatus are not connected via the particular server and a communication between the first client apparatus and the second client apparatus is not established:
transmitting to the particular server via the load balancer, a connection request including first identification information for identifying the particular server,
acquiring, from the load balancer, second identification information for identifying the particular server selected by the load balancer based on the first identification information from among the plurality of servers,
receiving the first identification information from the particular server, the first identification being acquired by the particular server from the connection request transmitted by the circuitry of the first client apparatus,
notifying the second client apparatus of the first identification information,
requesting the load balancer to connect to the particular server using the second identification information, and
requesting the load balancer to connect to the particular server using the first identification information.

10. A non-transitory recording medium storing a plurality of instructions which, when executed by one or more processors, causes the processors to perform a load balancing method executed by a first client apparatus included in a load balancing system, the load balancing system including the first client apparatus and a second client apparatus each of which communicates with a particular server of a plurality of servers, through a load balancer that distributes load of the plurality of servers, the method including, before the first client apparatus and the second client apparatus are not connected via the particular server and a communication between the first client apparatus and the second client apparatus is not established:
transmitting to the particular server via the load balancer, a connection request including first identification information for identifying the particular server,
acquiring, from the load balancer, second identification information for identifying the particular server selected by the load balancer based on the first identification information from among the plurality of servers:
receiving the first identification information from the particular server, the first identification being acquired by the particular server from the connection request transmitted by the circuitry of the first client apparatus,
notifying the second client apparatus of the first identification information,
requesting the load balancer to connect to the particular server using the second identification information, and
requesting the load balancer to connect to the particular server using the first identification information.

* * * * *